United States Patent [19]

Richard

[11] 4,235,610
[45] Nov. 25, 1980

[54] APPARATUS IN THE FABRIC FILTER CONTROL OF AIR POLLUTION

[75] Inventor: Kenneth L. Richard, Lake Toxaway, N.C.

[73] Assignee: York-Shipley, Inc., York, Pa.

[21] Appl. No.: 908,443

[22] Filed: May 22, 1978

Related U.S. Application Data

[63] Continuation-in-part of Ser. No. 826,824, Aug. 22, 1977, abandoned.

[51] Int. Cl.$^2$ .............................................. B01D 46/04
[52] U.S. Cl. ....................................... 55/302; 55/379; 55/381; 55/424; 55/365
[58] Field of Search .................. 55/272, 273, 282, 291, 55/302, 96, 381, 379, 365, 424

[56] References Cited

U.S. PATENT DOCUMENTS

| | | | |
|---|---|---|---|
| 3,626,674 | 12/1971 | Blackmore | 55/302 |
| 3,680,285 | 8/1972 | Wellan et al. | 55/302 |
| 3,726,066 | 4/1973 | Colley et al. | 55/302 |
| 3,765,152 | 10/1973 | Pausch | 55/379 |
| 3,901,671 | 8/1975 | Kitami | 55/341 NT |
| 3,926,595 | 12/1975 | Bockman | 55/302 |
| 3,973,935 | 8/1976 | Moore, Jr. et al. | 55/302 |
| 3,992,177 | 11/1976 | Welteroth | 55/341 NT |
| 3,999,968 | 12/1976 | Brookman | 55/341 NT |
| 4,058,379 | 11/1977 | Cheng | 55/302 |
| 4,077,781 | 3/1978 | Sundstrom | 55/96 |
| 4,113,455 | 9/1978 | Richmond | 55/378 |

FOREIGN PATENT DOCUMENTS

| | | | |
|---|---|---|---|
| 225059 | 10/1959 | Australia | 55/302 |
| 1585940 | 2/1970 | France | 55/378 |
| 507337 | 8/1976 | U.S.S.R. | 55/96 |

Primary Examiner—Bernard Nozick
Attorney, Agent, or Firm—Kemon & Estabrook

[57] ABSTRACT

Method and apparatus for maintaining the permeability of porous filtering media used in filtering gaseous suspensions. More particularly the invention defines Inside Bag Dust Collection wherein high energy pressurized gas is introduced for cleaning the filtering media. In the method and apparatus pneumatic impulse forces, derived from a series of charges of pressurized gas are directed downwardly through ever open venturi means and away from the interior of the filter bags; specific jet nozzle elements optimize the efficiency of the pressurized gas application, and an induced air funnel means within the bag causes vertical force resolution for induced air cleaning flow. Spoiler means are provided within jet nozzle means such that particulate matter will neither enter nor accumulate in the jet nozzle opening during normal, onstream gas flow conditions. There is also an accommodation to the conventional dirty gas chamber to efficiently receive high velocity, high volume induced air cleaning flow.

7 Claims, 16 Drawing Figures

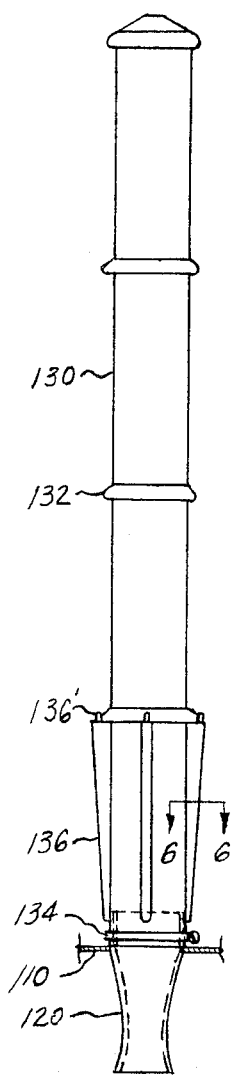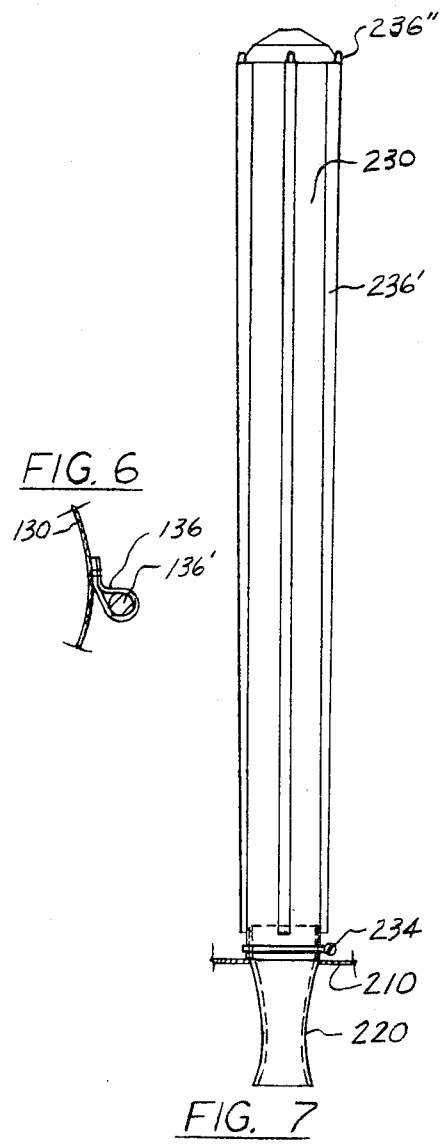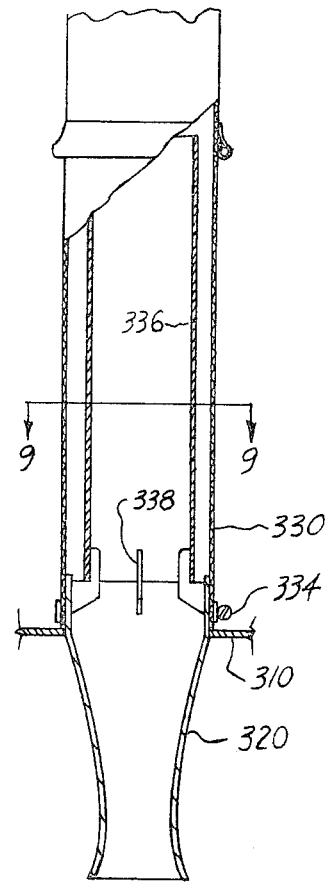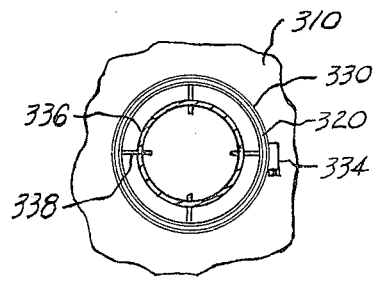
FIG. 5　　FIG. 6　　FIG. 7　　FIG. 8　　FIG. 9

APPARATUS IN THE FABRIC FILTER CONTROL OF AIR POLLUTION

BRIEF DESCRIPTION OF THE PRIOR ART

This is a continuation-in-part application of Ser. No. 826,824, filed Aug. 22, 1977, now abandoned, entitled: METHOD AND APPARATUS IN THE FABRIC FILTER CONTROL OF AIR POLLUTION.

Positive acting filter cleaning means is known in the patented prior art. In this art, one refers to an Inside Bag Collector as a dust collector having a clean gas chamber, communicating with an exhaust means, a dirty gas chamber arranged to receive a flow of dirty gas containing suspended solid particulate material and a plurality of filter bags arranged to have their interior surfaces communicate with the dirty gas chamber. In the normal filtering by such systems, the dirty gases flow into the lower dirty chamber, rise upward into the bag through its ever open mouth, the gas passing through the filter to deposit the particulate matter against the interior surfaces of the filter bag. Commonly, Inside Bag Collectors appear as reverse air and shaker types; Reinecke U.S. Pat. No. 3,430,419 and Nakao U.S. Pat. No. 3,964,883 being examples thereof. While such collectors attempt to free separated solid particles from the surface of the filter bags, they do not perform efficiently. This is because many such filter cleaners rely upon forces of gravity to direct the freed solid particles from the filter bags to a hopper area.

According to Stokes Law, when the frictional forces of a small solid particle passing through a fluid medium equal the acceleration due to gravity, the acceleration of the particle will be zero and the particle will fall at a uniform rate. In the conventional filter cleaners of the so-called reverse air and/or shaker types, a cleaning cycle of a short duration frees the solid particles from the inner surface of the filter bags but unfortunately does not allow sufficient time for the particles to fall out of the lower open ends of the bags. This is particularly true with smaller particles of lesser density, as well as those particles disposed in the upper portion of a given bag. To solve this problem, the reverse air and/or shaker cleaners have been provided with compartments where filter bags may be removed from the filtering air flow for a sufficient time to allow for settling of the freed particles within the bag during the cleaning cycle. These required added compartments greatly increase the size and cost of such apparatus. In addition such Inside Bag Collectors are constrained to use filter media which are useful at air velocities generally less than four feet per minute, further increasing the size and cost of the apparatus.

On the other hand, one often refers to an Outside Bag Collector which is a dust collector having a dirty gas chamber arranged to receive a flow of dirty gas containing suspended solid particulate material, a clean gas chamber communicating with an exhaust means, and a plurality of filter bags arranged to have their interior surfaces communicate with the clean gas chamber where said bags are generally vertically disposed. The exterior surface of said Outside Collector bags are exposed to and contained within the dirty gas chamber such that in normal filtering operation thereunder, the dirty gases flow into the dirty gas chamber, pass through the filter bags thereby depositing the particulate matter against the exterior surfaces of the bags, the filtered air then rising within the filter bag to the clean air chamber and to exhaust. Conventionally these appear as jet pulse collectors and are best described in the art by Brookman U.S. Pat. No. 3,864,108 and Reinauer U.S. Pat. No. 225,059. Such apparatus seeks to accomplish filter cleaning without isolating the bags to be cleaned from the continuous flow and circulation of dirty gases, by using short bursts of high energy pressurized gas. This combination of a cleaning cycle of short duration along with continuously circulating dirty gas allows the particles freed from the outer surface of the filter bags to reintrain at a lower point on the same or adjacent bags. In this manner after many cleaning cycles the solid particles migrate to the dirty gas chamber and/or hopper area for removal from the cleaner. Nonetheless, where the number of particles in the medium being filtered is greater than those migrating towards the hopper during a cleaning cycle, it will be obvious that particles tend to build up on the filter bags and the apparatus approaches a runaway condition. To solve this problem, the load on the cleaner is decreased, thereby reducing the efficiency, as compared to the design intended efficiency.

Further, it is recognized that this downward migration of particles on the exterior of bags is highly wasteful of energy, for work is done each time a particle is moved. Whereas it would be desirable at cleaning to remove all the particulate to the hopper below by a single cleaning blast of the pressurized gas, the particulate in fact moves only a short distance down the bag at each cleaning. It is recognized that a reasonable measure of the energy consumed by this type of jet pulse cleaner is 0.2 standard cubic feet of compressed air per bag cleaning. Typically a bag is cleaned thirty times per hour so that compressed air consumption per bag is six standard cubic feet per hour.

Again, prior art disclosures have been made of an Inside Bag Collector wherein the bag is to be cleaned by a short burst of high energy, pressurized gas. These teachings date back to 1958 reference: Pausch U.S. Pat. No. 3,765,152; Reinauer U.S. Pat. No. 225,059 and Brookman U.S. Pat. No. 3,999,968. Notwithstanding there has been no successful commercial exploitation of such apparatus. The reasons for this lay in a number of problem areas, such as: failure of the filter bag to collapse and clean in the manner expected, rather tending to move vertically up and down and to remain round; the total volume of cleaning gases must be large and move down into the dirty gas chamber at very high velocities so as to destroy normal flow patterns and to enter other bags so as to maximize reintrainment.

The present invention, on the other hand, was developed to make operable Inside Bag Collector systems wherein the bag per se is to be cleaned by short bursts of high energy pressurized gas. Those deficiencies which prevented such being operable have been overcome with the result that the reasonable measure of the energy consumed by an Inside Bag Collector is 1.0 standard cubic feet of compressed air, per hour, per bag cleaned; as opposed to the 6.0 standard cubic feet of compressed air previously noted. Further, in the present invention, the resulting method and apparatus utilize filter media which are also operative at higher velocities of gas flow, viz: above 4.0 feet per minute. Thus, savings in physical space layout and in operating power costs will amount to at least 30% over known systems.

SUMMARY OF THE INVENTION

The primary object of the present invention is to establish method and apparatus for the efficient operation of Inside Bag Collectors-Filter Cleaner. One employs herein high energy pressurized gas for selective discharge through jet openings, disposed in the ever open mouth of the filter bags, wherein the pressurized gas is directed to fire downwardly and away from the filter bag through ever open venturi means. The venturi means are significantly in sealed relation to the ever open mouth of the filter bag, the interior of the filter bags connecting therethrough to the dirty gas chamber.

There are five coactive improvements which form a part of this invention. These five improvements are: (a) means for multiple pulsing of pressurized gas within each filter bag for each cleaning of each bag; (b) a jet means having a balanced and ideal combination of aperture area, aperture length and number of apertures so as to maximize the energy utilization of pressurized gas; (c) an induced air funnel for each filter bag insuring a controlled and effective partial bag collapse as there is firing of the multiple pulse jet; (d) a large volume of induced gas flow herein which is highly concentrated with particulate matter which is thus forceably ejected by multiple pulse from a respective filter bag's interior, during the cleaning cycle all at high velocities of the order of 8000 feet per minute. These dispensed gases are not mixed with the incoming dirty gas stream, are prevented from entering other filter bags, and are reduced to near zero velocity, permitting particulate matter to settle to the bottom of the dirty gas chamber for removal; (e) spoiler means are provided as an integral part of the respective jet means, precluding entry of particulate matter to the jet apertures, such as would otherwise accumulate during periods when pressurized gas is not flowing.

More particularly, a first objective of this invention encompasses the use of multiple pulses from a source of pressurized gas via conduit having timer-controlled valve means, whereby pulses of pressurized gas having the desired frequency, duration and quantity may be supplied. Importantly, the prior art suggests single pulse application per bag to be cleaned.

Applying thus, two or more brief pulses of high energy pressurized gas will, it has been found, induce filtered gas backflow through the filter media having qualities of repeated impacting which at each instance of application will act forcefully on each particle lodged on the interior surface of the filter media. This, then insures maximum quantum removal of particulate matter from the filtering surfaces for the cleaning of each bag within a given system of the invention. The duration of each pulse herein and the accompanying induced air flow downward within a given filter bag conveys the dislodged particles down through the ever open mouth of bag and venturi means into the dirty gas chamber below. In the preferred embodiment there are three pulses of pressurized gas for each bag cleaning each pulse being of 0.3 second duration. The elapsed time for a filter bag cleaning is thus 1.0 seconds.

More particularly a second objective of invention involves maximizing the volume of induced air flow for any given condition of flow volume of pressurized gas. In quantitative tests it has been shown that the ratio of volumes of induced air to compressed air is inversely proportional to the cross sectional area of the jet hole through which the pressurized gas was released. The ideal range of hole areas is from 0.003 square inches to 0.035 square inches and within this range is found greatest efficiency for energy utilization of a given pressurized gas being consumed. It is within this range that the highest induced air ratios occur. Attention must also be given to the orifice of the jet hole so escape velocities may be maintained with the maximum orifice coefficient. Whereas any orifice introduces losses to the escape velocity of the pressurized gas, these losses are minimized where the length of the jet hole is not less than two nor more than five times the diameter of the jet hole.

The need for energy in the form of pressurized gas in an Inside Bag Collector is to accomplish three work efforts first, to establish that the force of dirty gas flow upward through the ever open venturi device be normalized and exceeded by the downward flow of the combined pressurized gas and induced gas; secondly that the induced gases backflow through the filter media; thirdly, that the particulate matter be conveyed out of the bag's interior via venturi means into the dirty gas chamber below. Since these energy requirements vary by application there is a need to be able to adjust the energy applied to each application for while insufficient energy will fail to clean the filter media, excessive application of energy beyond need is wasted energy. This problem is resolved primarily by critically varying the number of jet holes to meet the application need wherein each such jet hole area is limited to within the ideal range as heretofore described, and the problem is secondarily resolved by varying the pressure of the gas generally from 65 to 100 psig.

As a third objective of invention there will be no filter bag cleaning unless and until the lower filter bag section at the ever open mouth of the filter bag be prevented from overcollapsing. The first source for inducing air is from the area immediately adjacent to a fixed jet nozzle which is the release point for the pressurized gas and therefore bag collapse first occurs at this lower section of the filter bag.

A solution to this problem would seem to be an internal wire cage (FIG. 4 Pausch U.S. Pat. No. 3,765,152) to provide filter support and to prevent overcollapsing. The use of said internal wire cage is highly objectionable because said wire intermingles with accumulating particulate matter such that the collapsing motion of the filter media in cooperation with the supporting wire cage and the abrasive particulate matter causes extreme and rapid wear to the filter media. In high temperature applications requiring filter bags to be made of glass fibers, glass fibers will fracture and break when forced against any form edge, such as wire of a bag cage.

This invention on the other hand provides vertical support to the lower section of the filter bag between its ever open mouth and the first metal ring which is attached external to the filter bag. This preferably takes the form of a plurality of metal rods or tubes affixed external to the filter bag and parallel to the bag's center line, said rods limiting the extent of collapse of this lower section, thereby preventing overtensioning of the upper filter bag so that the entire bag surface may partially collapse and the induced backflow of gases will enter all surfaces of the filter bag. Another form that said plurality of rods may take, in supporting the fabric bag, is for the length of the rods to be substantially as long as the fabric bag and externally affixed thereto. In such form external metal rings are eliminated.

In a preferred embodiment, illustrated hereinafter, the filter bag is provided with a plurality of metal rings externally affixed to the bag in spaced vertical relationship to each other. Internal and concentric to the filter bag is fixed a rigid tube being ever-open at both ends said tube spanning the distance from the ever-open mouth of the filter bag to the first metal ring, adjacent a section heretofore referred to as the lower section of the filter bag. The diameter of the tube is small enough to permit partial collapsing of the lower section of the filter bag but large enough to prevent overcollapsing. In cooperation with the multiple pulses of pressurized gas and the resulting interrupted flow of induced gases, this lower filter bag section will become free and flushed of particulate matter even though the tubing surface per se is without holes. This tube is termed an induced air funnel for it causes the inducing force resulting from the released pressurized gas to act in a direction along the center line of the filter bag. In another form of induced air funnel there may be provided with plural apertures in portions or throughout its surface.

In further objective of invention, means are provided to handle the particulate laden gases which issue into the dirty gas chamber as a result of the release of pressurized gas which in turn induces large quantities of backflow gas. The volume of such issue will typically be six to ten cubic feet, per each bag cleaned, at velocities of approximately 8000 feet per minute. This is characteristically an overwhelming burden to a filtering system and acts to disrupt flow patterns within the dirty air chamber and to reintrain other bags thereby cancelling any value in the cleaning cycle.

There are several forms by which this improvement may be expressed. In a small filtering system where size is limited, the hopper should not be less in volume than the volume of issue of a single cleaning cycle. The issue herein is directed by baffling within the hopper so that the flow thereof will displace the gases pre-existing within the hopper. At the bottom of said hopper metal partitions are set such that as the high velocity issue drives downward into said partitions the issue will be partially trapped and will compress and thereby the velocity energy will be dispelled. Accordingly, in this form the gases within the hopper from which particulate matter has settled by gravity will be displaced into filter bags operating to receiver dirty gas flow; whereas the issue from the cleaning bags will do the displacing and will lose their energy of motion. In another form, the issue is directed out of the hopper by metal deflector guides and directed upward in a chute compartment having vane barriers to dispel the velocity energy, yet having bypasses therefrom wherein gases existing before within the hopper and chute structure may be displaced back to the hopper and into the filter bags which are operating to receive dirty gas flow. In the foregoing hopper structures and variations herein it is important that the issue from the filter bags cleaned must not be permitted to mix with the incoming dirty gas stream. Thus, to promote isolation of these gases the inlet for the dirty gas stream is located as high as possible within the hopper. The dirty gas stream being generally directed toward venturi structures thus demands that the dirty gas stream turn 90° or more, in order to enter the ever-open mouth of the venturi device. An additional advantage of this high inlet location is that inlet gas turns of 90° or more will allow heavier particles to fall into the hopper discharge.

In another form and generally in large filtering systems where the cleaning issue is less than the hopper volume there may be an inverted V-shaped baffle mounted centrally within the hopper throughout the length thereof and in line with the inlet flow of gases. The inverted V of approximately 60° included angle is located just below the dirty gas inlet thus dividing the hopper into an upper and a lower section. Communication between these upper and lower sections exists in the lengthwise space formed between the side walls of the hopper and the lower edges of the inverted V baffle. Normal dirty gas flow in a negative system will be maintained in the upper hopper section from inlet to ever open venturi devices. The issue will be of high velocity and cut through the normal dirty gas stream, it will be divided outward in its downward path by the inverted V baffle and be directed back together by the hopper side walls colliding with itself, so as to dispel velocity energy. The inverted V baffle further contributes to this dissipation of energy by allowing expansion throughout its length but traps the issue so that it may not rise to reintrain in the filter bags operating to receive incoming dirty gases. As in previous forms, pre-existing hopper gases are displaced by the arriving issue and rise to mix with incoming dirty gases.

In another form, to be illustrated and described, issue is directed by vanes out of the hopper via a one way check valve into a small chamber having at its upper end a semi-collapsed hopper filter bag, or filter covering and at its lower end a discharge means, such as a rotary valve, for removing accumulating particulate matter. The inflow of the issue to this chamber will immediately inflate the hopper filter bag or filter covering whereby gases will pass through the filter to atmosphere and thus out of the system. When the issue flow is completed, the hopper filter will partially collapse, releasing the particulate to fall by gravity to the lower chamber for removal by suitable discharge means. In this preferred embodiment two useful results have been achieved: (a) there is virtually zero reintrainment of particles because all of the cleaned bag issue has been totally removed from the main filtering system when the issue passes the check valve, or related means, (b) the issue when filtered by the filter bag or filter covering goes to atmosphere rather than to normal recycling back through the filter bags. This recycling of filtered gas, which is so characteristic of all other filter cleaning systems, adds to the exhaust fan load and causes pressure surges throughout the gas flow system.

In a variation of this preferred embodiment the filtered gases may pass directly to the system exhaust fan rather than to atmosphere by positioning this hopper filter bag or hopper filter covering within the chamber containing the normal filter bags. Alternatively, said hopper filters may be set in a chamber adjacent filter bags chamber but partitioned therefrom with communication thereto through a check valve or damper operative on pressure differential or driven coincident with the release of the pressurized gas at cleaning or some other convenient damper operating means.

The invention also provides for spoiler means to preclude particulate accumulation within the jet nozzle. This improvement provides a metal pin which is set centrally within each pressure gas entry hole, said pin projecting beyond the hole surface wherein hole is enlarged so that said hole with pin will provide the proper open area. The exposed end of said pin may be square or preferably flared aerodynamically to deflect particulate matter and yet will not materially affect the flow of released pressurized gas. Additionally, the open area of the hole becomes an annular ring, very narrow as a target for possible penetration by the particulate. The nozzle, in one preferred form will be ⅛ inch pipe having a wall thickness of 0.068 inches. A ¼ inch metal bar will be alongside and attached to this pipe such that holes drilled therethrough will be approximately 0.218 inches deep. The radial clearance between hole (7/32" DIA.) and spoiler pin (3/16" DIA.) located centrally therethrough is 0.016 inches providing a length-over-opening ratio of 0.218/0.016=13.6.

As illustrated hereinafter, the extended head of the spoiler pin together with the hole opening having such a high length to width ratio will protect the conduit from accumulation of particulate. Matter which may yet reach the hole to lodge within the hole will be removed upon release of the high velocity, approximately 40,000 feet per minute pressurized gas.

In yet another form there is devised a round or otherwise aerodynamic form, positioned external to the jet hole and in line with it so as to deflect gas laden particulate matter from the jet hole.

In yet another form there is a pivoting shield mounted as a cover to the jet holes while dirty gases are rising into the filter bag. Whereas when the pressurized gas is released, it will move aside the shield and the shield will remain aside and inoperative until the flow of pressurized gas ceases, allowing the shield by spring or by gravity and/or by gas flow conditions to return to position to cover said jet holes.

BRIEF DESCRIPTION OF THE DRAWINGS

Other objects and advantages of the invention will become apparent from a study of the following specification when viewed in the light of the accompanying drawings, in which:

FIG. 5 is a side view in elevation of a filter bag according to invention having horizontal support rings and vertical support rods, mounted to a venturi device;

FIG. 6 is an enlarged fragmentary sectional view taken along lines 6—6 of FIG. 5 showing the vertical support rods of FIG. 5;

FIG. 7 is a side view in elevation of a filter bag according to invention having vertical support rods as mounted to a venturi device;

FIG. 8 is a partial sectional view of a filter bag according to invention showing at least one horizontal support ring, an internal vertically mounted tube;

FIG. 9 is a fragmentary section view of line 9—9 of FIG. 8;

DETAILED DESCRIPTION

Figure 1:
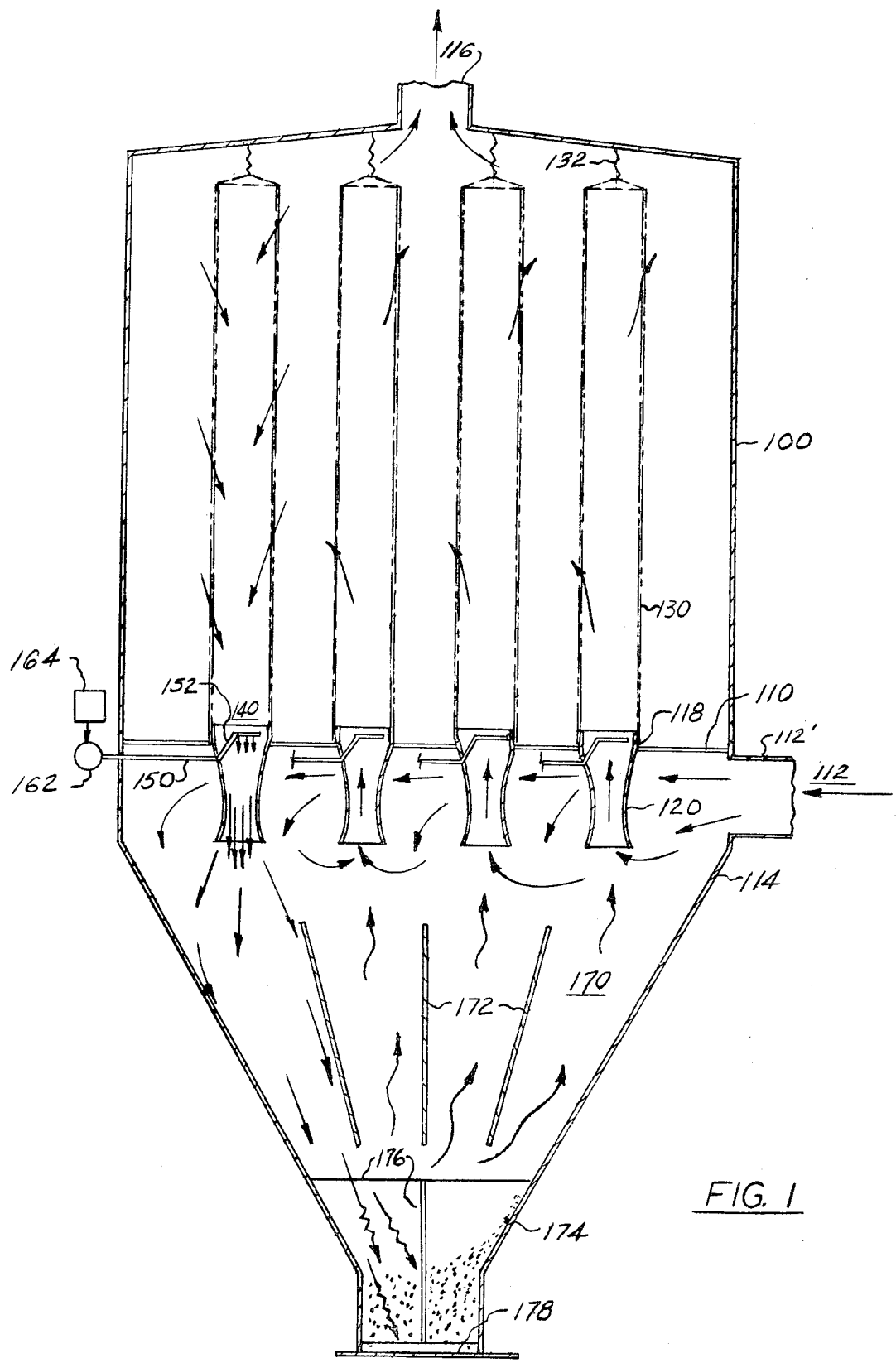
FIG. 1 is a vertical section view of one form of inside bag collection apparatus according to the invention having a velocity compression box.

Referring to FIG. 1, a vertically arranged unitary housing 100 contains horizontal partition 110 which divides the housing into upper and lower compartments. The lower compartment of the housing defines side walls 114. A horizontal inlet 112 leads into the wall 114 through which a particle-gaseous medium mixture to be filtered may be introduced into the housing via supply conduit 112'. At the bottom of the lower compartment is a solid particle outlet 178 for removing separated solid particles therefrom. At the upper extremity of the upper compartment is a second outlet 116 for removing the filtered gaseous medium from the housing. Connected to the second outlet 116 is a suitable vacuum means, not shown, adapted to draw the filtered gaseous medium from the upper compartment of the housing. The horizontal partition 110 defines a plurality of openings 118 in which are mounted generally cylindrical, vertically arranged venturis 120, respectively. The design of these devices is such as to insure high energy performance. Arranged within the upper compartment of the housing 100 are a plurality of vertically arranged inverted porous filter bags 130. The upper closed end of each bag is suspended inside from the top of the upper compartment by bag tensioning support means 132. The lower ends of the filter bags are ever-open, the same being connected concentrically about the upper cylindrical skirt of each corresponding ever-open venturi.

Jet nozzle 152, located within each venturi 120 are respectively connected to a source of pressurized gas (not shown) via conduit 150 and a solenoid diaphram valve 162 which valve is controlled by timer means 164. As may be programmed by timer 164, diaphram valve 162 will release a volume of pressurized gas along conduit 150 to as many jet nozzles as may be connected thereto, reference FIG. 10. Each jet nozzle 152 contains at least one hole which opens downward so that pressurized gas flowing therethrough will be centrally directed at the lower ever-open mouth of venturi 120. In this way, said gas will spread over the entire cross-sectional area of said ever-open mouth.

In the filtering operation, dirty gases enter inlet 112 and are forced to turn at least 90° to enter the lower ever-open mouth of a plurality of venturis 120 and to rise within corresponding filter bags 130. The gas passing through the filter media deposits particulate matter against the interior surface of the filter, after which it rises through the clean gas upper compartment to the exhaust 116.

Figure 10:
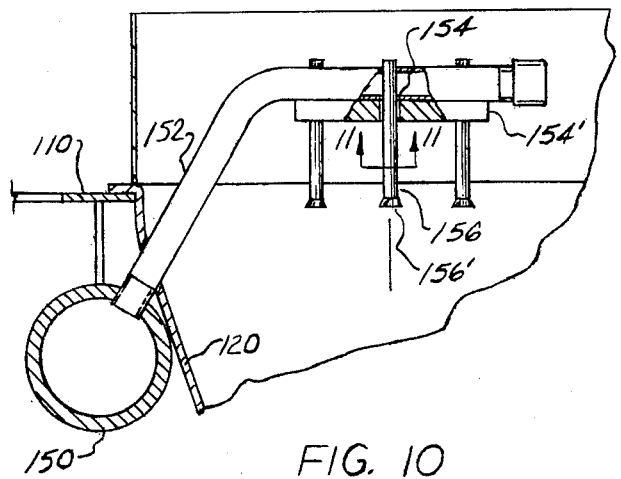
FIG. 10 is a partial section side view of venturi jet nozzle design according to invention having spoiler pin.
Figure 11:
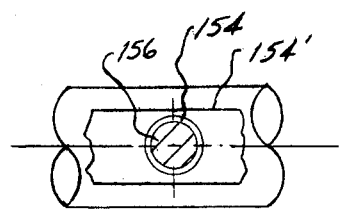
FIG. 11 is an enlarged fragmentary section view of 11—11 of FIG. 10.
Figure 12:
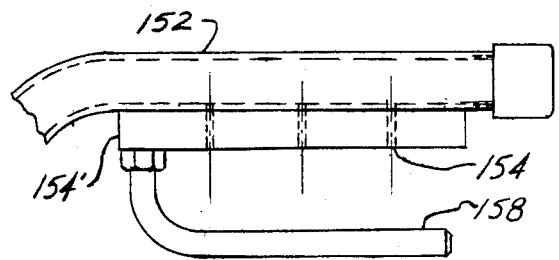
FIG. 12 is an enlarged side view of portion of FIG. 10 illustrating a spoiler rod.
Figure 13:
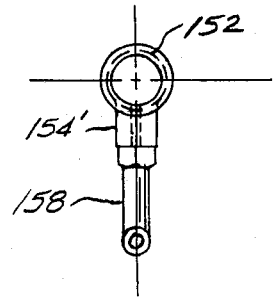
FIG. 13 is an end view of the spoiler of FIG. 12.

As the dirty gases rise up through venturis 120 said gases encounter jet nozzle 152 and the open holes therein. These particles would enter the nozzles were the holes not protected. Referring in this connection to FIGS. 10 through 14, FIG. 10 illustrates jet nozzle 152 thread mounted to conduit 150 which in turn is mounted to horizontal partition 110 via suitable spacer. In FIGS. 10 and 11 spoiler pin 156 is centrally located within jet hole 154, thus defining a ring shaped hole of sufficient area to deliver the pressurized gas, yet restrictive to preclude inflow of particulate matter. Particulate inflow to the interior control area of nozzle 152 is further restricted by lengthening hole 154 by means such as a braze assembled bar 154'. In this preferred form, particulate inflow is further restricted by a spoiler head form 156' which will act as a barrier and deflector to rising particulate matter. FIGS. 12 and 13 show an alternate nozzle assembly form in which a fixed spoiler 158 is located so as to deflect rising particulate from jet holes 154.

Figure 14:
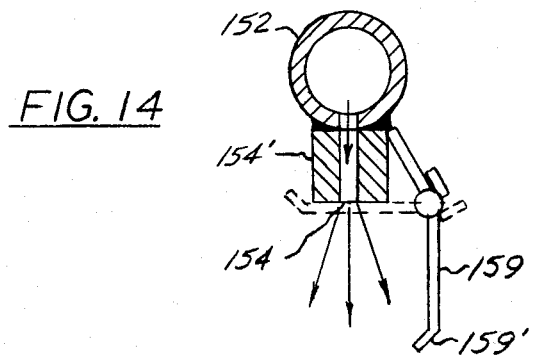
FIG. 14 is a vertical cross section view of a portion of FIG. 10 showing a modified jet nozzle according to invention having a movable plate which alternately covers and then exposes the jet holes.
Figure 15:
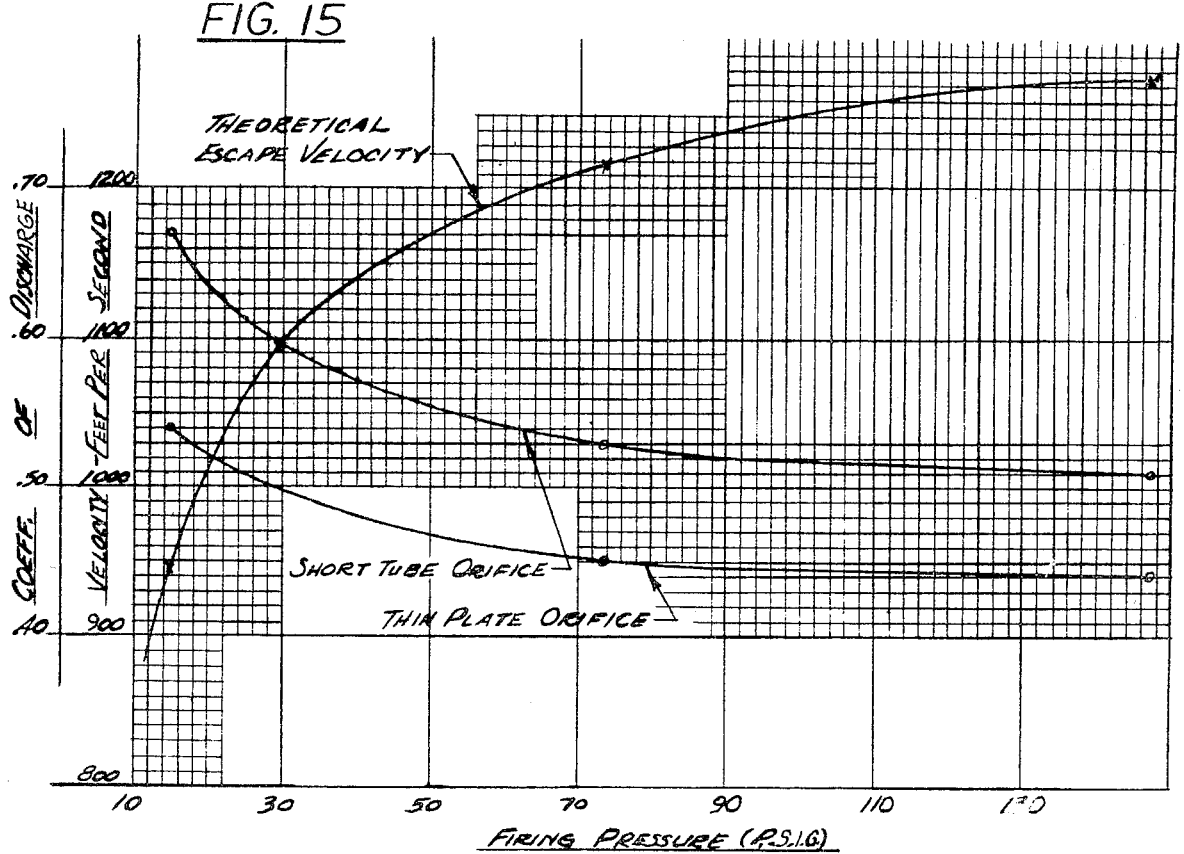
FIG. 15 is a chart depicting the relationship of theoretical escape velocity of pressurized gas vs. pressure along with orifice coefficients vs. pressure.

FIG. 14 illustrates an alternatively hinged spoiler plate 159 which will pivot down and away when the pressurized gas is released. Cessation of pressurized gas flow permits dirty gas upflow to resume which rising gas hitting the deflector extension 159' of spoiler plate will position spoiler plate 159 so as to cover jet hole 154, thereby positively preventing particulate inflow to the interior central area of the jet nozzle 152. The number of holes per jet nozzle may vary from one according to the energy required, as previously described. It will be observed that bar 154' is a means by which hole 154 is provided a short tube orifice which orifice is not so long that the escape velocity of the released pressurized gas will be reduced by reason of pipe flow resistance. FIG. 15 shows this relationship of escape velocity and short tube and thin plate orifice coefficients for various gas pressures. The preference herein is for the short tube orifice to minimize velocity loss factors, reference Data from Machinery's Handbook, 20th Edition, page 2315.

Figure 16:
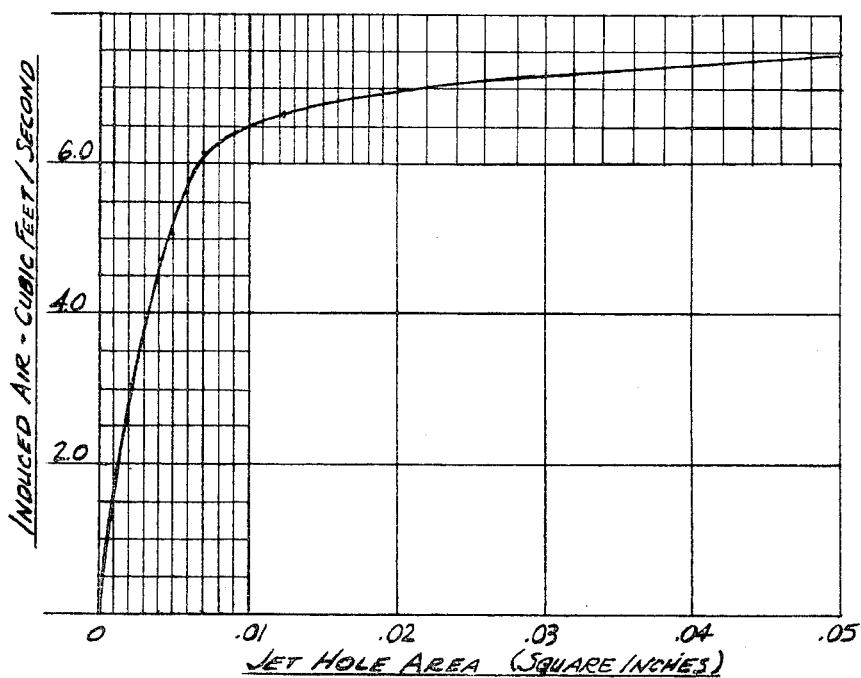
FIG. 16 is a graph comparing induced air volume jet hole area in accordance with invention objectives.

FIG. 16 illustrates test data herein which plots induced air flow against jet hole area and wherein gas pressure was held constant. Since the jet hole area is exactly proportional to compressed air consumption it is seen that small holes are highly efficient, under this constant condition, within a narrow range and that diminishing returns become severe as jet holes exceed 0.035 square inches.

Referring back to FIG. 1, and by way of explaining operation, dirty gas shown by arrows to enter the lower dirty gas chamber at its upper level and just below horizontal partition 110, to circulate downward, as indicated to the ever-open mouth of ventures 120 and to rise into filter bags 130. At the same moment timer 164 has activated valve 162 to release pressurized gas to conduit 150 so as to fire downward from respective jet nozzles 152 associated with corresponding filter bags 130. This pressurized gas firing through associated venturies 120 totally closes venturi openings to any upward dirty gas flow and creates a reduced pressure zone in the adjacent upper area 140 of the venturis. As previously described, the filter bag 130 must be properly supported in order that this reduced pressure will be equally influenced to the full filter area. In practice it has been observed that the lower 25%, approximately, of the filter bag must be supported radially and axially; the balance of the bag length must be supported radially, and finally, the filter bag must be mounted in tension. It is thus with the need for adequate support of the lower section of the filter bag to which this improvement is directed, otherwise, the respective filter bags will not operate to effectively clean.

FIGS. 5 through 9 illustrates three variations in construction by which critical support for the lower filter bag sections may be achieved. FIGS. 5 and 6 show conventional ring support 132 affixed to the exterior of filter 130. Ring clamp 134 seals lower ever-open mouth of the filter bag to the upper portion of venturi 120 which venturi passes through and is mounted to horizontal partition 110. Vertical pockets 136 are externally affixed to the lower section of the filter bag and contain rigid rods 136' the upper portion of each rod being radially restrained by the lowermost bag ring 132, the bottom of each rod being radially restrained by the upper portion of the venturi 120. FIG. 6 specifically shows the mounting relationship of rod 136' within pocket 136 affixed to filter media 130. These vertical rods permit the filter media to move inward upon influence of reduced pressure allowing the filter to relax and be flushed clean by the backflow of gas therethrough. Secondly, the rods preclude a vertical tension increase to the filter above its lower section by the inward movement of the lower section. Said inward movement of the lower filter media is uniform throughout rather than a segmental caving-in as would be the case without the vertical rods. Thirdly, the rods 136' restrict and limit the inward position of the filter thereby only partially satisfying the requirement of the reduced pressure, causing gas to flow downward from above and thus maximizing the vertical component portion of the forces created by the reduced pressure. This results in cleaning the filtering surfaces of the entire bag.

FIG. 7 is similar to FIG. 5 physically and operatively, except that the rods 236" and pockets 236' extend the full length of the filter bag, thereby vertically and horizontally supporting the entire filter.

In the preferred form of FIGS. 8 and 9 the filter series 330 is shown. Here an induced air funnel solid funnel 336 extends throughout the length of the lower section of the bag 330 and is mounted on brackets 338 which are affixed to the upper extremity venturi 320 centrally positioned relative to the fabric filter 330. The balance of the filter bag, not shown, will carry external rings in a spaced relationship to each other. The reduced pressure zone at the upper extremity of the venturi is now seen more clearly to be influenced by the funnel 336 whereby said reduced pressure zone will demand upon gases which are primarily within said funnel 336, and will demand only partially upon the gases outside said funnel 336 but within this lowest section of filter bag 330 thereby maximizing the vertical component portion of the forces created by the reduced pressure assuring that the resulting operational backflow will cause a uniform collapse of upper as well as lower sections of the filter media 330 as limited by the ring supports. There results on the filter media by multiple pulsing a pneumatic shaking of the filter media. The impact of each pulse application partially collapses the filter dislodging the accumulated particulate, while the duration of each said pulse conveys the particles down the filter bag. In operation six to ten cubic feet of gas backflowing and downflowing within each six inch diameter bag for each bag cleaning is seen to be a large purging downflow. With said pneumatic shaking and it can be seen that the filter media immediately surrounding funnel 336 will rapidly move back and forth being subject to the very negative pressure zone of the venturi and will therefore clean adequately without overcleaning, given that the diameter of the funnel is properly selected.

Derived from these improvements are high induced air ratios demonstrating efficiency of application of the energy supplied, together with substantial purging volumes in the cleaning cycle. Reference again to FIG. 15, selecting at 90 p.s.i.g. an escape velocity of 1240 feet per second, modified by a short tube coefficient of 0.52, yields an actual escape velocity of 645 feet per second egress from a jet hole into the upper venturi zone. A jet cross-section of 0.0123 square inches having escape velocity of 645 feet per second yields a flow of pressurized gas of 0.055 cubic feet per second. The FIG. 16 data shows an induced air flow according to invention of 6.6 cubic feet per second, yielding an induced air ratio of 6.6/0.55=120:1, an outstanding result of energy utilization in practice. Wherein 6.6 cubic feet per second is the backflow of a single jet hole, the second hole located within the same jet nozzle will be about 75% as effective, or 5 cubic feet for a total of 11.6 cubic feet per second. However, the downflow must overcome a normal upward dirty gas flow amounting, typically, to about 2.5 cubic feet per second which reduces the 11.6 cubic feet per second to approximately 9 cubic feet backflow per second or, more particularly, 9 cubic feet per bag cleaning. This example shows the reasonableness of the 6 to 10 cubic feet of backflow previously referred to herein.

Referring once again to FIG. 1, convergent direction vanes 172 are mounted within the hopper 170 in such position that the downflow of cleaning gases, hereinafter termed issue, from any given row of venturis which are programmed for cleaning, will be directed to the bottom of the hopper. See how the left row issue is thus channelled. At the bottom is located a compression box 174 consisting of one or more vertical partitions 176 which, together with the lower walls of the bag house form vertical compartments. The partitions shown, form four compartments. Connected to and immediately downstream from discharge 178 is a device, such as a rotary valve, which never has a through opening. Vanes 172 are spaced above partitions 176 sufficiently to insure that as the issue proceeds downward between vanes 172, or between vane 172 and the wall 114, so that the preexisting particulate settled gases therein are displaced ahead of the issue to bypass compression box 174 flowing upward to mix with the incoming dirty gases. The issue being of high velocity, approximately 8000 feet per minute, will drive downward into the compression box 174 and dissipate its velocity energy in compressing therein. The issue will then expand to system conditions of pressure and volume thereby further displacing any remaining preexisting particulate settled gases upward to mix with the incoming dirty gases. The issue is now dormant in the lower chamber such that contained particulate matter will settle by gravity to discharge 178 for continuous removal.

Figure 2:
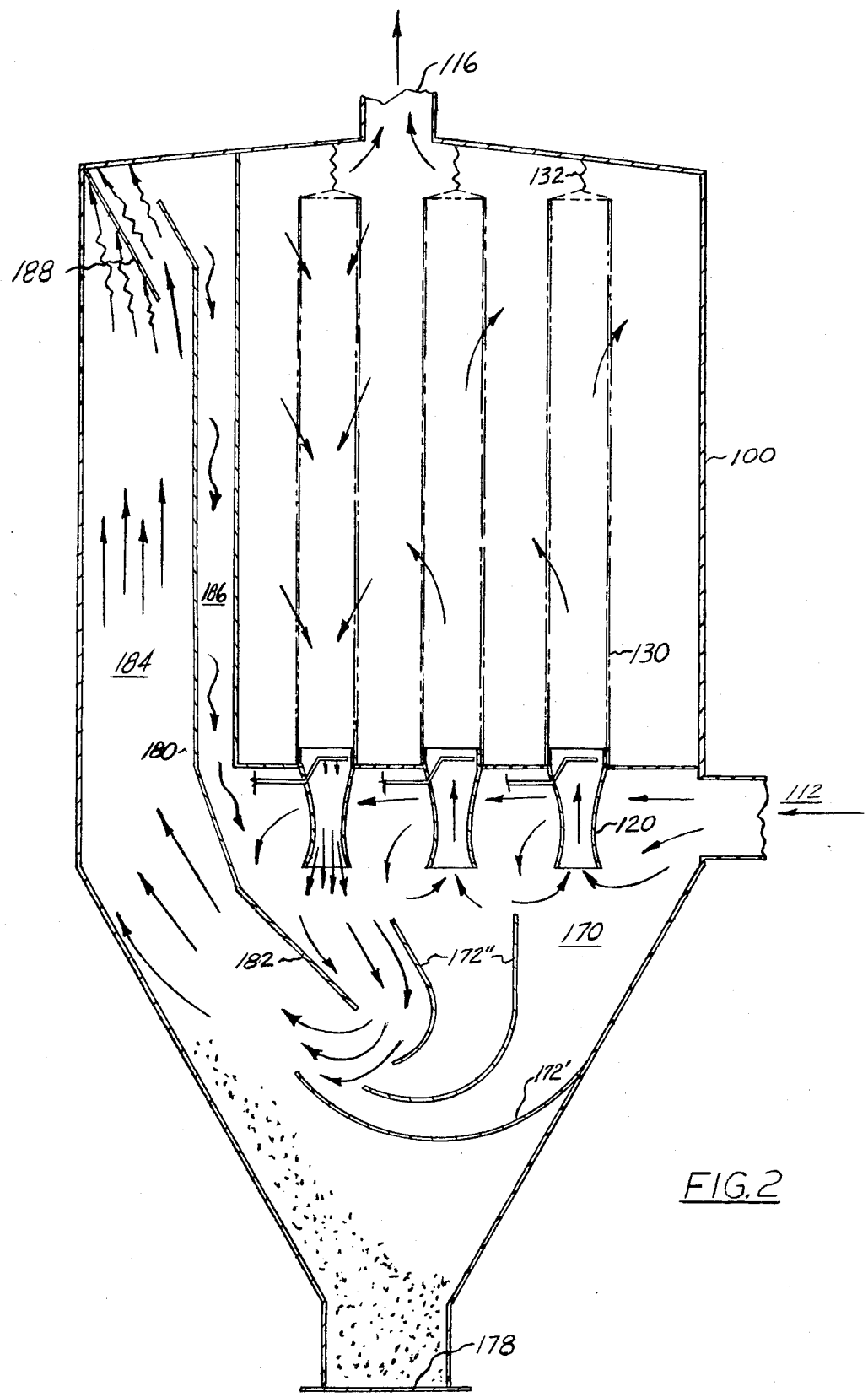
FIG. 2 is a vertical sectional end view of inside bag collection apparatus according to the invention and having by way of modification a vertical chute hopper extension.

FIG. 2 depicts a specific hopper construction in which the hopper, per se is too small for the full volume of issue. Here extra hopper space for the issue is provided by a vertical chamber. The left most bag row is being cleaned without discontinuing normal onstream flow of dirty gases to adjacent bag rows. In all embodiments of FIGS. 1-4 herein, cleaning of a given bag is undertaken while onstream dirty gas flow continues to all filter bags not then being cleaned. Arcuate guide vanes 172' and 172" and the lower section 182 of partition 180 cooperate to guide and deflect the cleaning issue down and out of the lower hopper area and up into chamber 184 displacing the before contained particulate settled gases up chamber 184 and sequentially down passage 186 to hopper to mix with the incoming dirty gases. The high velocity issue will be trapped by the top of chamber 184, by vane 188 and the upper end of partition 180 compressing to dispel the issue velocity energy. Before the next programmed filter bag cleaning, there is time for the high particulate concentration of the issue now occupying chamber 184 to settle out by gravity to discharge 178.

Figure 3:
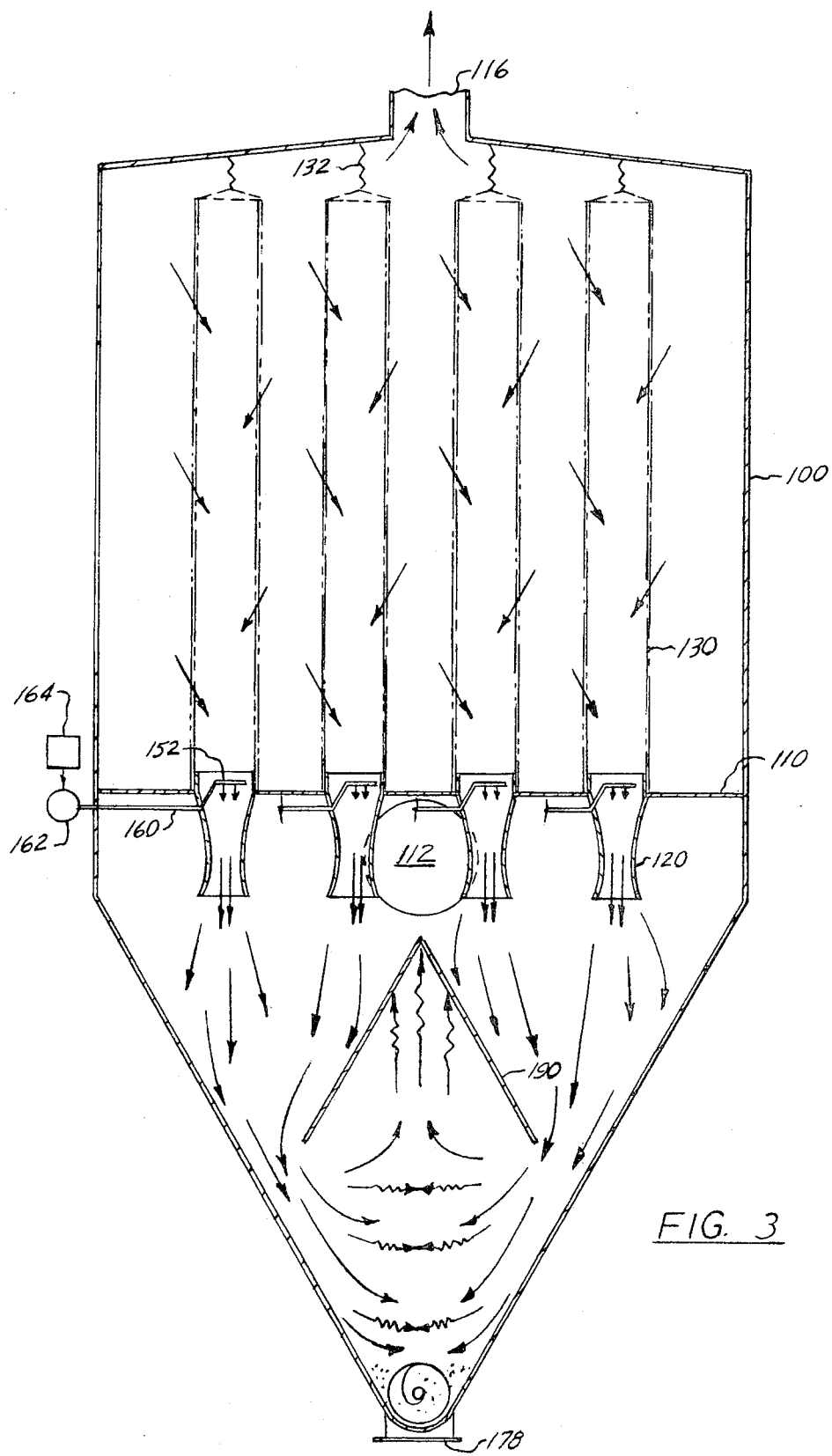
FIG. 3 is a vertical sectional end view of inside bag collection apparatus according to the invention having by way of modification an elongated inverted V deflector separator.

FIG. 3 shows yet another form of hopper. This is generally applicable to large hoppers wherein crosswise rows of bags are cleaned simultaneously, other bags in a lengthwise row remaining open to receive and filter dirty gas. Inverted V baffle 190 runs lengthwise of the hopper dividing the hopper into an upper and lower sections wherein the dirty inlet gases enter the upper section via inlet 112 located above but in line with the baffle 190 so as to establish normal dirty gas flow in said upper section; whereas the lower section is to receive the cleaning issue and to serve as a settling chamber for the issue, particulate matter thereafter settling to a screw conveyor to discharge 178. The issue firing from all venturis in the crosswise row passes downward and is separated by inverted V baffle 190. As the baffle or vane 190 forms an inverted dihedral angle, relative to the converging walls of the dirty gas chamber, there is caused by the issue converging of issue upon lower hopper walls so as to collide and dissipate the velocity energy of the issue. As shown, the subsurface of baffle 190 is a further suppressor to the velocity energy of the issue as well as a trap to preclude reentry of the high density issue to the upper hopper section before particulate settling has taken place. As the downwardly directed issue thus collides and is trapped beneath baffle 190, the issue will extend lengthwise thereby replacing the before existing particulate settled gases which latter gases are displaced from the lower to the upper hopper section to mix with the incoming gases.

Figure 4:
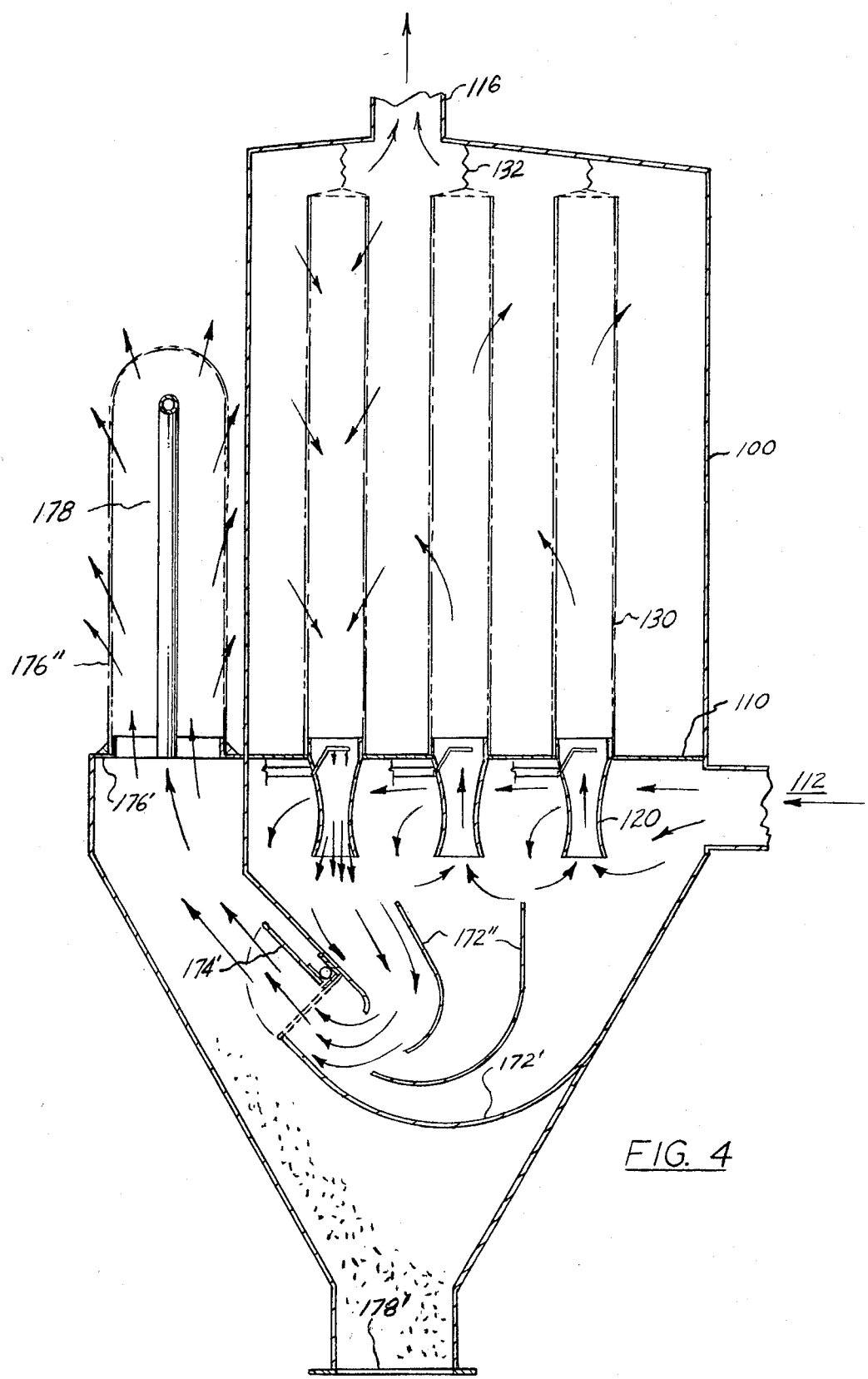
FIG. 4 is a vertical sectional end view of inside bag collection apparatus according to the invention having by way of modification pressure valve means and a hopper bag and discharge for complete removal of issue.

FIG. 4, being a modification, illustrates the preferred form of hopper. This is devised to receive the high velocity, high volume cleaning issue and is considered to be ideal for all sizes of Inside Bag Collectors. Vanes 172' and 172" typically serve to direct the issue down and out of hopper past valve 174' which is opened by the force of the high velocity issue, quickly closing upon removal of said force. Valve 174' may typically be a check valve but will vary in function according as the collector system is negative or positive. Clearly, once gases pass through valve 174' they pass finally from the dust collector system, the surrounding chamber being at some different pressure, preferably atmosphere. Cover 176' provides seal means for hopper bag cover 176" held thereto with suitable clamps. Frame 178' supports hopper bag 176" during periods when no cleaning issue is being fired into the lower chamber. Upon arrival of issue, hopper bag 176" inflates under the pressure of the high velocity issue remaining inflated until the velocity has been dissipated by the issue's passing through said hopper bag to atmosphere while depositing particulate matter against the interior surface of said hopper bag. The collapsing of the bag due to gravity will be arrested by support 178' whereas the particulate matter will crumple and fall through the lower chamber past valve 174' to discharge 178.

In another expression of this preferred form, the upper section of FIG. 4 may be extended so as to include hopper bag 176" within said extended upper section. In yet another form wherein hopper bag 176" is included within extended upper section but said bag being separated by a partition from all filter bags but arranged to communicate with said filter bags via a damper, the damper being open when cleaning takes place.

Of course, persons skilled in this art will quickly appreciate that various changes or modifications may be made. Thus, whereas the figures show 3 or 4 filter bags or rows of bags while various numbers of bags or rows of bags may be used. The venturi devices have been described as one venturi for each bag whereas these improvements apply to other venturi arrangements as well, such as a single venturi device serving more than one bag. The hopper bag of the preferred hopper arrangement form FIG. 4 may be one or more bags where said bags may be any shape, such as envelopes, rounds, covers and the like. Positive and negative systems were each discussed, in part, but are implied as equally useful for all improvements of this invention.

Therefore, while the presently preferred embodiment along with other forms of improvements have been shown and described, persons skilled in this art will recognize that these illustrated embodiments constitute only a few particular examples of the broad invention which is generally defined in the following claims. Although the relative size of components herein may be critical, the diameter and length of the said bags may vary appreciably herein.

I claim:

1. A filter apparatus for separating solid particulate matter from gases and permitting selective cleaning of groups of the filter elements while others remain on stream comprising:
    a housing having a horizontal partition therein to define upper and lower compartments for clean and dirty gases respectively;
    a plurality of venturis mounted through and supported by said partition communicating said upper and lower compartments therethrough;
    an equal number of porous filter bags vertically supported within said upper compartment, the lower open end of each bag being closed around the upper end of one of said venturis respectively;
    inlet means opening into said lower compartment for admission of particulate laden gases to be cleaned;
    outlet means at the upper end of said upper compartment for release of cleaned gases;
    particulate removal means at the lower end of said lower compartment;
    a plurality of jet nozzles one downwardly directed in each of said venturis respectively;
    means for selectively supplying groups of said nozzles with bursts of high pressure gas to induce a high velocity reverse flow of clean gas from said clean compartment inwardly through the associated bags to thereby remove the filtrate from the interior surfaces thereof and convey it toward the bottom of said dirty compartment while the other venturis remain on stream; and
    plural fixed vane means in said lower compartment positioned below the level of said inlet means to direct filtrate cleaned from said bags away from the lower end of all of said venturis and inlet gas flow stream and toward said particulate removal means in order to prevent reentrainment of filtrate into those venturis which remain on stream during the cleaning process.

2. Apparatus as defined by claim 1 in which the walls of said dirty compartment converge downwardly and said vanes converge upwardly and join below the lower level of said venturis and said inlet.

3. Apparatus according to claim 1 in which any one opening in each of said jet nozzles has an area of between about 0.003 and 0.012 square inches.

4. The filtering apparatus according to claim 1 wherein the bag includes means for radial and vertical restraint against collapse.

5. Apparatus as defined by claim 4 in which said restraint means includes a tubular fluid flow barrier of less diameter and length than said filter bags and supported concentrically therein at the lower end of said bags.

6. Apparatus as defined by claim 1 wherein said dirty compartment includes an upwardly directed closed particulate settling extension and wherein said vanes are curved to direct gases carrying particulate material cleaned from said filter bags upwardly into said extension while permitting the particulate material to fall by gravity to said removal means.

7. The apparatus according to claim 6 further comprising valve means separating the vanes from the vertical extension of the lower compartment and bag means secured to the extension for momentary capture of the particles.

* * * * *